March 13, 1951

T. O. McCARTHY ET AL
PERFORMANCE RECORDING INSTRUMENT
FOR DIRECTION INDICATORS 2,544,851

Filed Feb. 21, 1946

10 Sheets-Sheet 1

INVENTORS
Thomas O. McCarthy
John L. Maulbetsch
BY
M. O. Hayes
ATTORNEY

INVENTORS
Thomas O. McCarthy
John L. Maulbetsch
BY
M. O. Hayes
ATTORNEY

March 13, 1951 T. O. McCARTHY ET AL 2,544,851

PERFORMANCE RECORDING INSTRUMENT
FOR DIRECTION INDICATORS

Filed Feb. 21, 1946 10 Sheets-Sheet 3

INVENTORS
Thomas O. McCarthy
John L. Maulbetsch
BY [signature]
ATTORNEY

March 13, 1951 T. O. McCARTHY ET AL 2,544,851

PERFORMANCE RECORDING INSTRUMENT FOR DIRECTION INDICATORS

Filed Feb. 21, 1946 10 Sheets-Sheet 4

INVENTORS
Thomas O. McCarthy
John L. Maulbetsch

BY M. C. Hayes

ATTORNEY

March 13, 1951 T. O. McCARTHY ET AL 2,544,851

PERFORMANCE RECORDING INSTRUMENT FOR DIRECTION INDICATORS

Filed Feb. 21, 1946 10 Sheets-Sheet 5

INVENTORS
Thomas O. McCarthy
John L. Maulbetsch
BY M. O. Hayes
ATTORNEY

INVENTORS
Thomas O. McCarthy
John L. Maulbetsch
BY [signature]
ATTORNEY

March 13, 1951 T. O. McCARTHY ET AL 2,544,851

PERFORMANCE RECORDING INSTRUMENT FOR DIRECTION INDICATORS

Filed Feb. 21, 1946 10 Sheets-Sheet 7

INVENTORS
Thomas O. McCarthy
John L. Maulbetsch
BY M. O. Hayes
ATTORNEY

March 13, 1951 T. O. McCARTHY ET AL 2,544,851

PERFORMANCE RECORDING INSTRUMENT FOR DIRECTION INDICATORS

Filed Feb. 21, 1946 10 Sheets-Sheet 8

INVENTORS
Thomas O. McCarthy
John L. Maulbetsch

BY M. O. Hayes

ATTORNEY

INVENTORS
Thomas O. McCarthy
John L. Maulbetsch
BY M. O. Hayes
ATTORNEY

INVENTORS
Thomas O. McCarthy
John L. Maulbetsch
BY M. O. Hayes
ATTORNEY

UNITED STATES PATENT OFFICE 2,544,851

PERFORMANCE RECORDING INSTRUMENT FOR DIRECTION INDICATORS

Thomas O. McCarthy, United States Navy, and John L. Maulbetsch, Port Washington, N. Y.

Application February 21, 1946, Serial No. 649,423

9 Claims. (Cl. 346—2)

This invention relates generally to photographic recording instruments and in particular to instruments for recording photographically the performance errors of direction indicators or direction stabilizers, such as gyrocompasses and repeaters or the like while under actual operating conditions underway either at sea, on land or in the air.

Hitherto the testing of gyrocompasses and other navigational direction indicators in shore laboratories has left unrevealed many errors that arise under actual operating conditions of the vehicle or craft on which the indicator is installed. Other direction indicators used for non-navigational purposes, such as for gun fire control abroad naval vessels or aircraft, are also subject to errors arising or increasing while underway. Such errors are also present in land vehicles on which direction indicating devices are installed for various purposes, or where directionally-stabilized devices are used, as in military tanks.

One object of the present invention is to provide a performance recording instrument for direction indicators or directionally-stabilized devices, such as gyrocompasses, self-synchronous alidades and the like, wherein the scale readings or other data necessary for determining the performance errors are recorded photographically while underway.

Another object is to provide a performance recording instrument for direction indicators are directionally-stabilized devices wherein a photographic camera is mounted upon and is rotatable with the rotary element of the direction indicator or direction stabilizer, and optical and illumination systems are provided for imaging, in a common plane, such factors as the direction scales of the instrument, the level and cross-level conditions thereof relative the horizon, the time of the observation, and the identifying number of the particular exposure being made.

Another object is to provide a performance recording instrument for direction indicators or directionally-stabilized devices wherein a housing containing a photographic camera and certain optical systems is mounted upon the rotary element thereof for rotation therewith, the optical systems imaging, in a common plane, the compass bearing or azimuth scale, the relative bearing scale, the level and cross-level conditions as indicated by the horizon, the time of the particular observation and the number of the exposure, the camera being focused upon the common image plane for photographing the latter at chosen intervals of time, so as to give a running photographic record of the data by which the performance of the direction indicator or stabilizer may be analyzed.

Another object is to provide a performance recording instrument as set forth in the foregoing objects, wherein a sun telescope is mounted upon the instrument housing for rotation therewith, the housing having a rotary adjustment relative the rotary element of the direction indicator or stabilizer so that the cross lines of the sun telescope may be readjusted into coincidence with the sun's image when an error of the direction indicator or stabilizer causes the cross lines to deviate from such coincidence, this deviation being optically imaged and photographed by the camera within the instrument.

Reference is hereby made to the copending application Serial No. 614,584, filed September 5, 1945, now Patent Number 2,520,948, issued September 5, 1950, by Thomas O. McCarthy.

Further objects and advantages of this invention, as well as its construction, arrangement and operation, will be apparent from the following description and claims in connection with the accompanying drawings, in which Fig. 1 is a side elevation showing a preferred embodiment of the instrument of this invention mounted on a direction indicator;

Similar numerals refer to similar parts throughout the several views.

*General arrangement*

Figure 1:
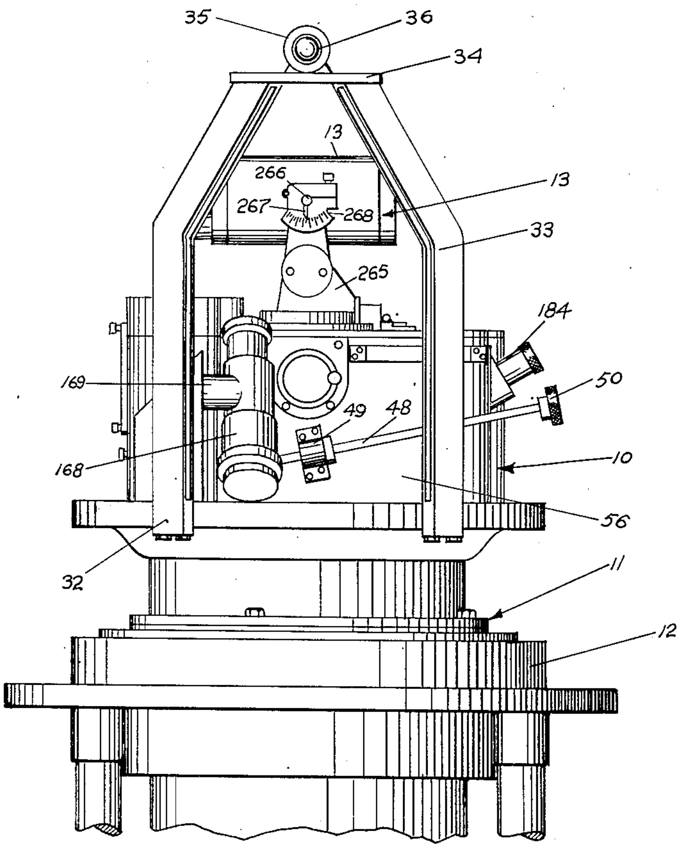
Figure 2:
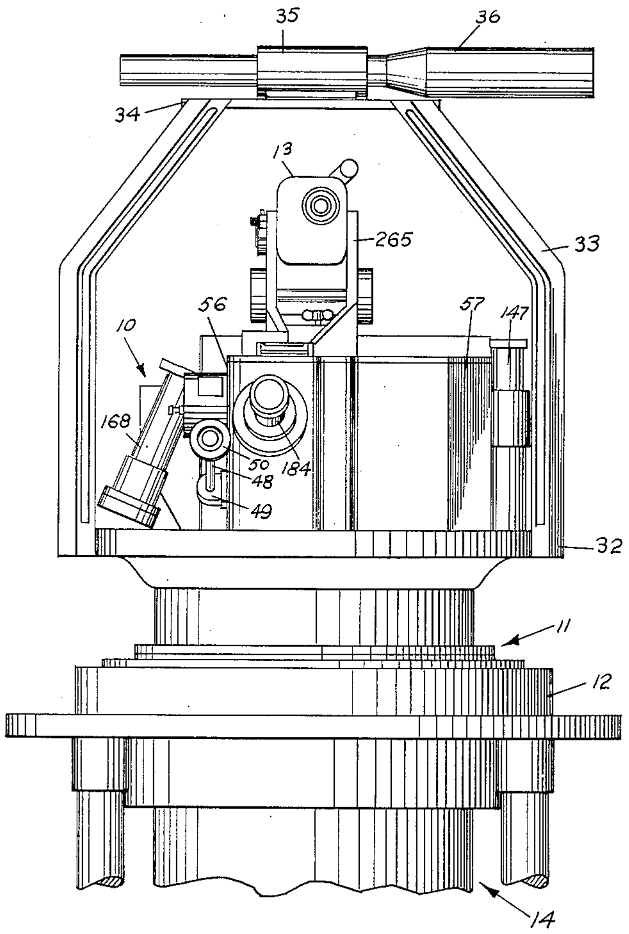
Fig. 2 is a front elevation of the instrument.

The performance recording instrument of this invention in general includes a housing mounted upon the output shaft of a direction indicator or direction stabilizer (such as a gyrocompass or self-synchronous alidade) so that the housing rotates as a unit with this output shaft. Mounted on the top of the housing is a conventional sun telescope with cross lines or stadia lines, which may be aligned with the sun's image by an independent worm gear adjustment of the housing relative the output shaft of the direction indicator or stabilizer. Mounted on the gimbal ring of the direction indicator or stabilizer is a bracket structure carrying a cross-level telescope arranged above and at right angles to the sun telescope.

The housing contains two illumination systems and three optical systems, all of which focus and image in a common plane, which is at the first focal point of a camera of the type permitting multiple successive exposures to be made quickly upon a film. A camera found suitable for this purpose is of the type known commercially under the trade name "Leica." One optical system images an azimuth scale connected to the output shaft of the direction indicator or stabilizer and also a stationary scale which is fixed relative the ship, together with an index and vernier for both the movable and the stationary scales, which are illuminated by one illumination system. An auxiliary optical system is combined with this to enable these scales to be observed visually. A second optical system images a watch and a pair of exposure counters connected mechanically to the film winding knob of the camera so that the time and the successive number of the observation may be photographed, these being illuminated by the second illumination system. One of the exposure counters, arranged to be visible through a window in the housing, indicates the same exposure number as the other counter, which is being imaged by the optical system and photographed by the camera. The camera objective is mounted in an extension tube in order that it may be focused upon the comparatively near image plane of the various optical systems. A third optical system images the horizon and a reticle in the common image plane whereby the condition of level and cross-level at the instant of exposure may also be recorded photographically. The latter optical system contains two objectives on opposite sides of the housing, together with movable selecting prisms operated manually by a knob. By this means either objective may be used as desired, depending upon which side of the housing permits the less obstructed view of the horizon. An additional control is provided for varying the location of the index mark or reticle that is seen with the horizon image, for the purpose of compensating for atmospheric refraction. The optical parts are mounted in rigid supports so as to maintain a fixed relationship on the inner frame.

The camera photographs the previously mentioned observations upon a film. After the film is developed, it is used for the purpose of preparing a plot or graph which inlicates, for each exposure, the error of the direction indicator or stabilizer at the particular time shown by the watch. The compass bearing of the sun, corrected for the level and cross-level and time of observation, is referred to the true bearing of the sun as computed by the usual methods of navigation. The difference between the indicated bearing of the sun, as thus corrected, and the true bearing of the sun is the error of the direction indicator or stabilizer for the particular observation. A running record of these errors is obtained by taking repeated observations at suitable time intervals and charting the errors for different conditions of speed, course, roll and pitch and acceleration forces accompanying changes in course or speed.

*Housing and connections*

Fig. 1 shows the performance recording instrument, generally designated 10, mounted upon a direction indicator or stabilizer, generally designated 11. The latter is shown as a conventional self-synchronous alidade connected operatively to and synchronized with the master gyrocompass of the ship, aircraft or vehicle upon which the tests are to be taken. A self-synchronous alidade is a gyrocompass repeater having an amplifier for imparting power sufficient to rotate the instrument 10 and a conventional sun telescope 13 mounted thereon. This power is sufficient to rotate the instrument 10 so as to maintain the sun telescope 13 substantially in bearing upon the sun or other celestial body or landmark, regardless of changes in the course being steered.

The direction indicator or stabilizer 11, instead of a self-synchronous alidade, may consist of a magnetic compass with suitable means for amplifying the torque of the compass card or it may consist of any remotely controlled directionally stabilized device whose performance is to be recorded, such as a gun, gun director, range finder, or a directionally stabilized projector or receiver of heat, light or sound waves or radio electrical energy.

The direction indicator 11 is mounted upon a supporting stand 12, which is secured to the deck of the ship, and contains a bowl 14 provided with a repeater assembly (not shown) having an output shaft 15 (Fig. 5) responsive to the motion transmitted from the master gyrocompass. The bowl 14 is mounted in the stand 12 by means of conventional outer and inner gimbal rings (not shown) to allow for roll and pitch of the ship.

Figure 5:
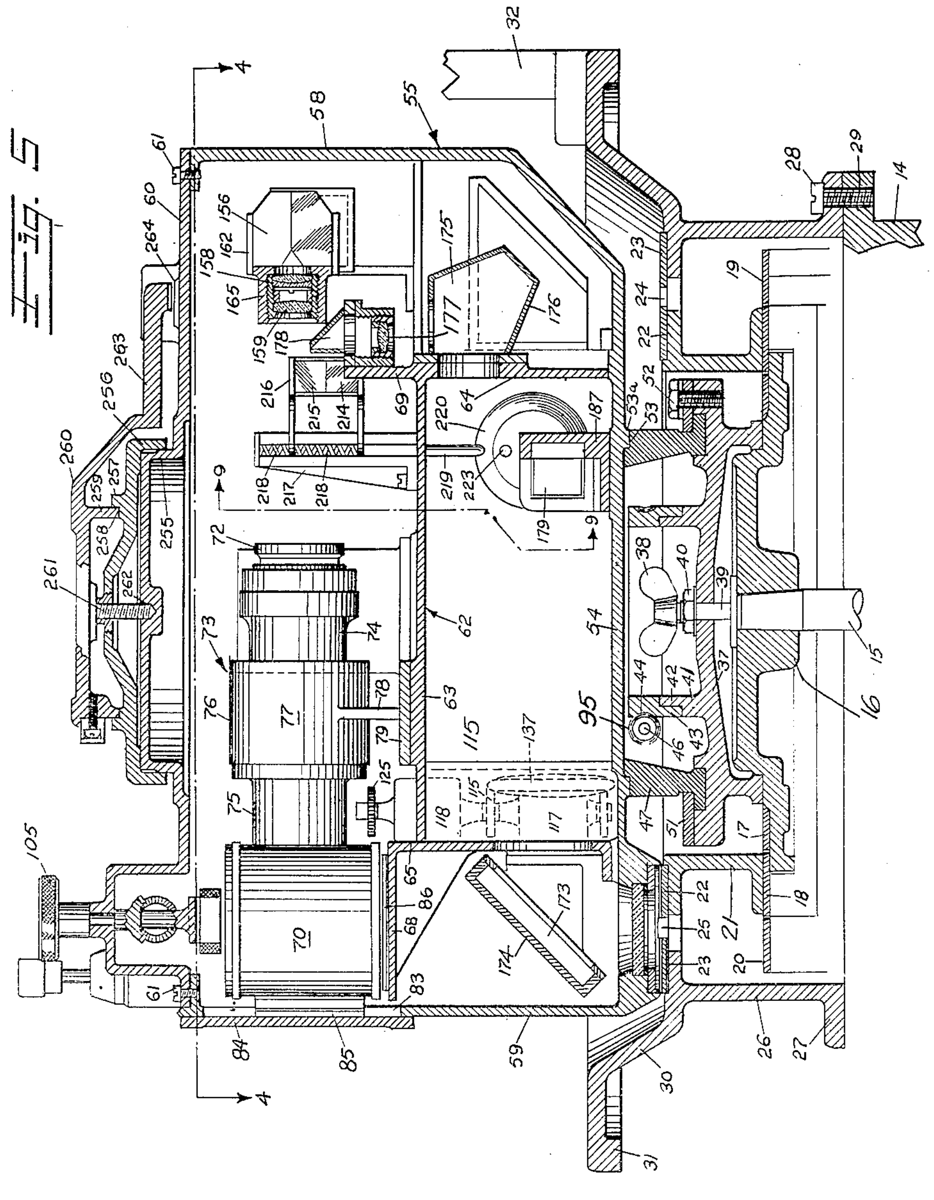
Fig. 5 is an approximately central vertical section taken along the line 5—5 of Fig. 4, with the camera partly in side elevation, showing the general internal arrangement.

Mounted upon the output shaft 15 of the direction indicator or stabilizer 11 (Fig. 5) is a rotatable mount 16 provided with an annular rotary scale 17 graduated in degrees throughout its entire circumference. Mounted externally and concentric with the scale 17 is an annular movable scale 18 also graduated in degrees. Mounted externally of the scale 18 is a lubber line plate 19 and diametrically opposite this is a vernier plate 20. The rotatable mount 16, the scales 17 and 18 and the plates 19 and 20 are conventional and their details form no part of the present invention. Mounted upon the movable scale 18 and secured thereto as by screws (not shown) is a compass bearing scale support 21 (Fig. 5) in the form of a flanged ring and carrying on its upper rim a compass bearing scale 22. The latter is graduated in degrees and is mounted in careful alignment and concentricity with the movable scale 18, the zeroes of both scales being also coincident. Mounted outwardly from and concentric with the compass bearing scale 22 is a relative bearing scale 23 likewise graduated in degrees and separated therefrom by an annular vernier space or slot 24 which is occupied by the vernier 25. The latter is provided with arcuate outer and inner graduations arranged adjacent the graduations on the relative bearing scale 23 and compass bearing scale 22 respectively. The relative bearing scale 23 is mounted upon an annular support 26 having a lower flange 27 secured as by the screws 28 to the cover mounting 29 of the bowl 14 (Fig. 5). The annular support 26 is flared outwardly as at 30 and terminates in an upper flange 31. The latter serves to support the annular cross-level telescope frame 32 (Fig. 1) and is provided with upright arms 33 arching over the performance recording instrument 10 and sun telescope 13 to meet in a platform 34. Secured to the platform 34 is a tubular mount 35 which holds the cross-level telescope 36. The cross-level telescope 36 is provided with a reticle having a horizontal cross line (not shown), which the cross-level observer attempts to maintain in alignment with the horizon while shifting the entire assembly by grasping the upright arms 33.

Supported on the rotatable mount 16 so as to rotate therewith is a saucer-shaped support 37 (Fig. 5) secured to the output shaft 15 by a wing nut 38 threaded upon the threaded portion 39 rising from the output shaft 15 and provided with a lock nut 40. The support 37 is provided with an upstanding flange 41 having a stepped portion 42 upon which is mounted the correspondingly stepped portion 43 of an annular worm gear 44 (Fig. 5) with which meshes a worm 45 upon a worm shaft 46. The latter is journaled at its opposite ends in bushings (not shown) in a flanged annular worm support casing 47 and externally of the instrument is connected through reduction gearing (not shown) to a shaft 48 (Fig. 1) journaled in a bearing bracket 49 secured to the side of the instrument. The shaft 48 terminates in a knob 50. The flanged portion of the annular worm support casing 47 is secured to the support 37 by a retaining ring 51 bolted to the support 37 by the cap screws 52 (Fig. 5). The casing 47 is provided at its upper edge with a stepped seat 53, which receives the correspondingly stepped portion 53*a* on the bottom 54 of the housing 55. The latter contains the optical parts of the performance recording instrument 10.

Figure 4:
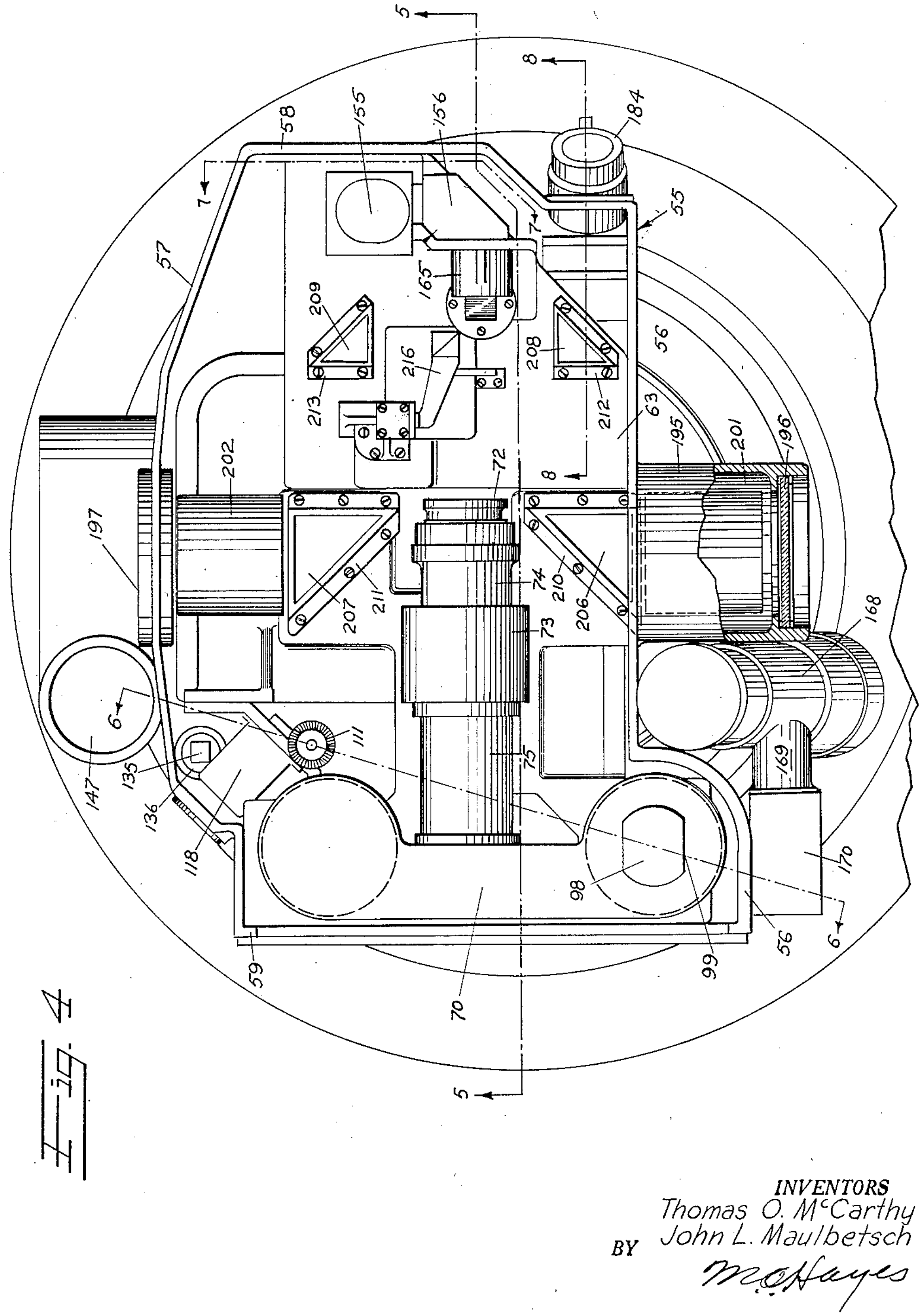
Fig. 4, is a horizontal section taken along the line 4—4 of Fig. 5, showing the internal arrangement as seen from above with the top cover plate removed.

The housing 55 (Figs. 4 and 5) is a roughly rectangular box provided with side walls 56 and 57, a front wall 58 and a rear wall 59. A cover plate 60 is secured by the screws 61 to the housing 55. Mounted within the housing 55 and rising from the bottom wall 54 thereof is a box-like supporting structure 62 (Fig. 5). The latter serves to support the various optical parts and also the camera as hereinafter described. The structure 62 is open at the bottom like an inverted box and is provided with a top wall 63, front and rear walls 64 and 65 (Fig. 5) and side walls (not shown). A shelf 68 projects rearwardly from the rear wall 65, and an upright portion 69 extends upwardly from the front wall 64 and top wall 63.

The shelf 68 and the top wall 63 serve as a support for a camera 70, which is focused upon an image plane 71 (Fig. 14) into which images of the various objects to be photographed are brought into a common focus. The camera 70 is preferably of the multiple exposure type wherein the observations are photographed successively upon motion picture film, and is arranged to permit the taking of exposures in rapid succession.

*Photographic system*

The camera 70 is of a conventional type well known under the tradename "Leica." The objective lens 72 of the camera, however, is mounted in a tubular extension generally designated 73 (Fig. 5) and consisting of a forward portion 74 and a rearward portion 75, the latter telescoping within the former. The forward portion 74 is mounted in a bracket 76 having a tubular portion 77 supported by a pedestal 78. Said pedestal is provided with a base 79 secured to the top wall 63 of the box-like structure 62. The rearward end of the rearward portion 75 is threaded into the front wall of the camera 70 at the opening provided customarily for the objective lens 72 itself. By this means a light tight connection is made, yet the camera 70 may be separated facilely from the objective lens 72 and its bracket 76 and removed for reloading or other purposes.

The objective lens 72 is threaded into the forward end of the forward portion 74 (Fig. 5). The objective lens 72 is of a conventional type commonly supplied with such cameras and is preferably of the so-called anastigmatic type equipped with the usual iris diaphragm for regulating the aperture. By means of the extension tube 73, the camera objective lens 72 is enabled to focus sharply upon the image in the image plane 71 (Fig. 14) and this in turn is imaged sharply upon the film in the camera 70, even though the distance between the lens 72 and image plane 71 is short.

The rear wall 59 of the housing 55 is provided with an access opening 83 to which is secured a cover plate 84 (Fig. 5). A pressure member 85 is secured to the cover plate 84 and urges the camera 70 and the rearward extension tube portion 75 attached thereto into telescoping engagement with the forward extension tube portion 74 within the tubular bracket 76. The camera 70 itself is secured to the shelf 68 with a spacing member 86 therebetween (Fig. 5).

Figure 3:
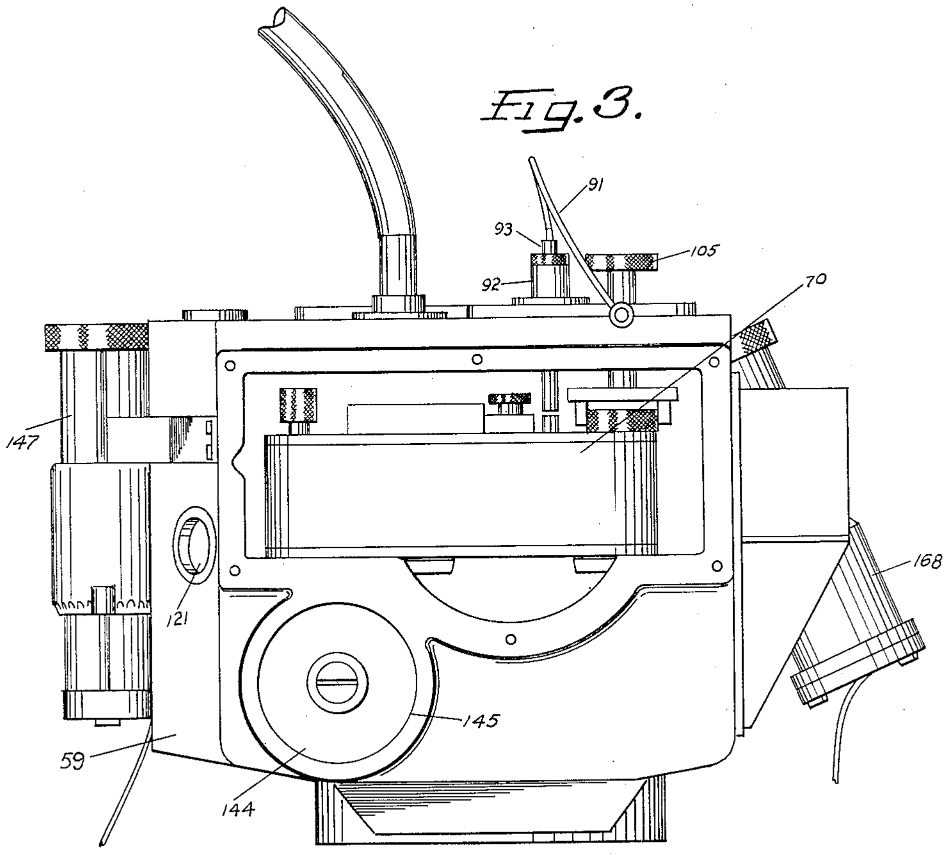
Fig. 3 is a rear elevation of the instrument, with the camera cover plate removed.

The camera 70 is provided with the usual exposure button 87 (Fig. 6), which is engaged by a plunger 88 extending downwardly through the cover plate 60 at a boss 89 secured to the underside thereof. The plunger 88 at its upper end is provided with a knob or button 90 urged upwardly by a compression spring (not shown) mounted within the boss 89. The knob 90 of the plunger 89 is actuated by a conventional flexible cable release device 91 connected to its surrounding casing 92 by the threaded collar 93 (Fig. 3).

*Exposure counter and timing system*

Figure 6:
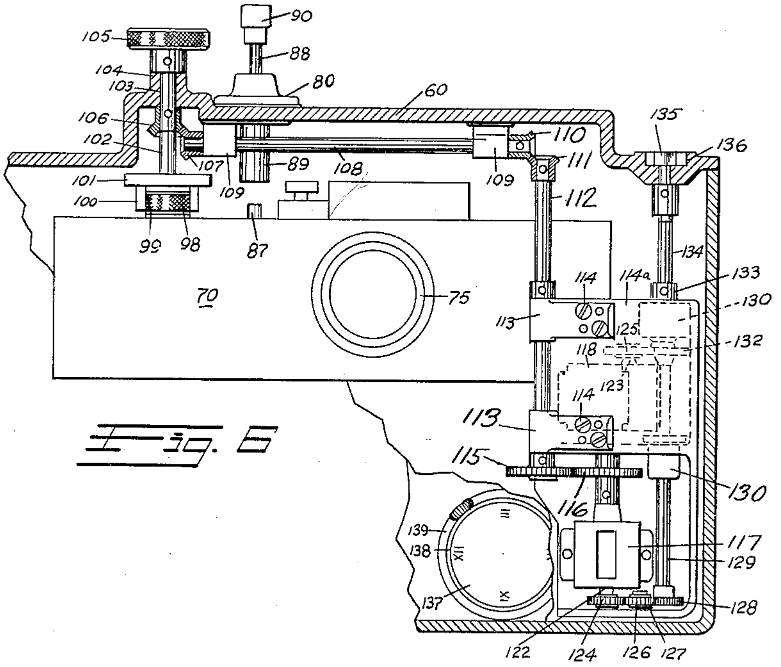
Fig. 6 is a vertical section taken along the line 6—6 of Fig. 4, showing the exposure counter and film winding mechanism.

The camera 70 is provided with the usual film wind knob 99 having flattened portions 99 engaged by the arms 100 of the adapter 101 secured to a shaft 102 extending upwardly through a bore 103 and boss 104 in the cover plate 60 (Fig. 6). Pinned to the shaft 102 at its upper end is an upper film winding knob 105.

Consequently, when the upper knob 105 is turned, the lower knob 98 also turns and the exposed film is transported and the new film portion brought into position in the camera 70 in the customary manner. At the same time, the camera shutter, which is of the focal plane type, is reset, as is well known to those skilled in the art. The provision of the flattened portions 99 and adapter 101, however, enables the camera 70 to be withdrawn rearwardly through the access opening 83 (Fig. 5) without disturbing the adapter 101 and its connected parts.

Pinned to the shaft 102 immediately beneath the cover plate 60 is a bevel gear 106 meshing with a bevel gear 107 secured to a shaft 108. Said shaft 108 is mounted rotatably in bearing brackets 109 depending from the underside of the cover plate 60 (Fig. 6). Secured to the opposite end of the shaft 108 is a bevel gear 110 meshing with a bevel gear 111 secured to a vertical shaft 112. The latter is mounted rotatably in bearing brackets 113 secured as at 114 to a bracket 114*a* secured to the housing 55.

Secured to the lower end of the shaft 112 is a pinion 115 meshing with a pinion 116 secured on its opposite sides to the operating shafts of lower and upper counters 117 and 118, which in turn are secured to the rear wall 59 of the housing 55. The counters 117 and 118 are of a conventional type well known in the machinery art. The numerals of the lower counter 117 face inwardly so as to be photographed by the camera 70 through an optical system described below. The upper counter 118, however, faces rearwardly at an angle and its numerals are viewed through a window 121 in the side wall 59 (Fig. 3). In this manner, whenever the upper film winding knob 105 is turned to transport film, the mechanism described actuates counters 117 and 118 simultaneously and in synchronism and the operator can view the reading of the counter 118 through the window 121.

The counters 117 and 118 are also provided with resetting shafts 122 and 123 (Fig. 6) on which are mounted pinions 124 and 125 respectively. The pinion 124 meshes with an idler pinion 126 mounted on a stud 127 threaded into the bracket 114*a*. The idler pinion 126 in turn meshes with a pinion 128 secured to the lower end of the counter resetting shaft 129, which is mounted rotatably in bearing bosses 130 in the bracket 114*a*.

The pinion 125 of the upper counter 118 meshes with a pinion 132 secured to the shaft 129. The latter is connected by a coupling 133 to a shaft 134 terminating in a counter resetting knob 135 mounted in a recess 136 in the cover plate 60. By rotating the knob 135 the numerals of both the upper and lower counters 117 and 118 may be returned to zero or reset at any desired value, such as when reloading the camera 70 with unexposed film.

Mounted beside the lower counter 117 is a precision watch 137 (Fig. 6) whereby the exact time of the particular observation may be photographed along with the exposure number and other data. The watch 137 (Fig. 6) is positioned on its side with the twelve o'clock and six o'clock numerals in a horizontal plane. The counter 117 is likewise on its side so that its numerals are arranged vertically and could be read by tilting the head to one side as would be necessary in reading the time from the watch 137. The watch 137 is secured in a socket 138 of a watch holder 139. The watch holder 139 is secured removably to the rear wall 65 of the supporting structure 62 (Fig. 5), which is provided with an aperture (not shown) through which the watch holder 139 and watch 137 are removable rearwardly. Access to the watch holder 139 is had through an access plate 144 threaded into an aperture 145 (Fig. 3) of the rear wall. By using a plurality of holders 139 and watches 137 the particular watch in use may be removed and another substituted as desired. The watch 137 is preferably set to indicate Greenwich Civil Time as is customarily used in navigation, this being checked for accuracy with the ship's chronometer.

The watch 137 and lower counter 117 are illuminated by an electric projection bulb and condensing lens system (not shown) mounted in a lamp house 147 secured to the side wall 57.

Figure 7:
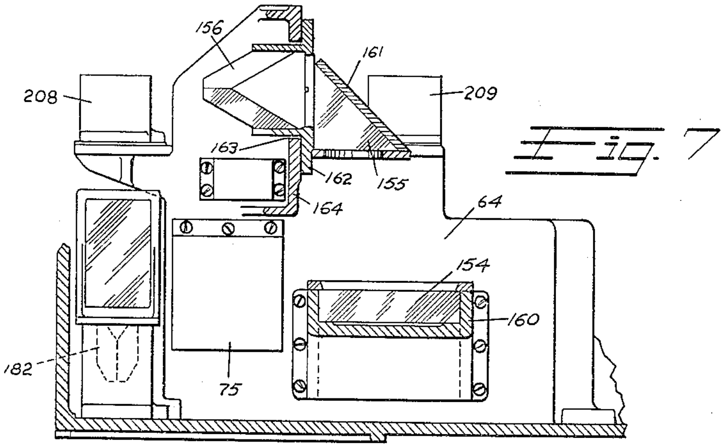
Fig. 7 is a vertical section along the line 7—7 of Fig. 4, showing a part of the scale imaging system.
Figure 14:
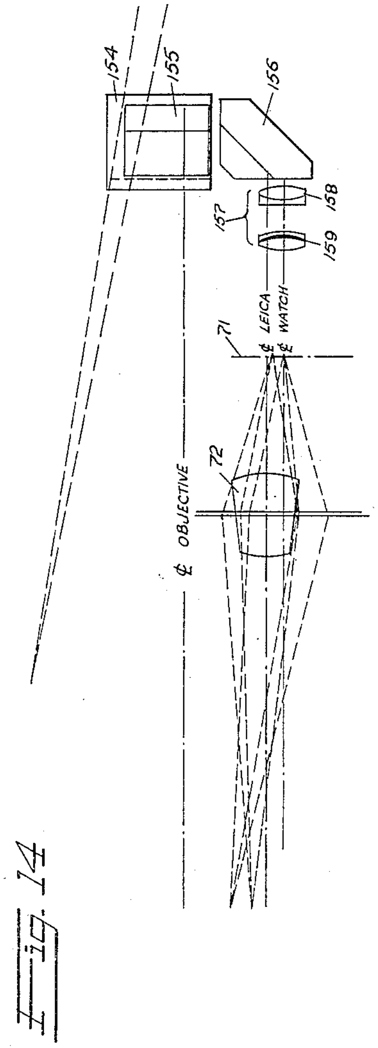
Fig. 14 is a schematic plan view of the watch and counter imaging system.
Figure 15:
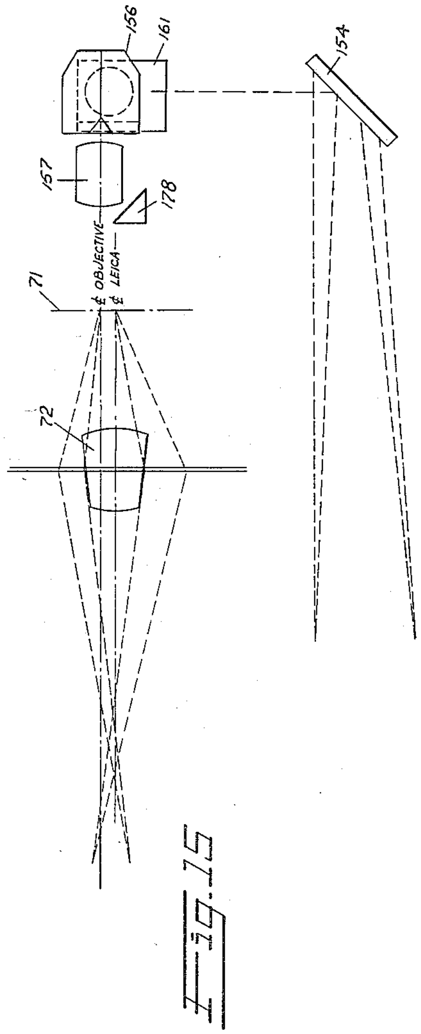
Fig. 15 is a side elevation of the system shown in Fig. 14.

Rays from the watch 137 and lower counter 117 traverse the interior of the supporting structure 62 and are reflected upwardly by a lower inclined mirror 154 (Figs. 7, 14 and 15) to a right angle prism 155 which further reflects them into a roof prism 156. The latter reflects said rays at right angles through the lens system 157 consisting of the compound lenses 158 and 159 (Fig. 14). The rays passing through the lens system 157 come to a focus in the image plane 71 upon which the camera objective 72 is focused, thereby producing a sharp image of the watch and counter upon the film in the camera 70. The mirror 154 is supported in a mount 160 (Fig. 7) secured to the forward wall 64 of the supporting structure 62. The prism 155 is supported in a mount 161 secured to a mount 162, which contains the roof prism 156 and which is supported in an aperture 163 in an upright portion 164 extending upwardly from the supporting structure 62. The lens system 157 is supported in a cell 165 (Fig. 5) secured to the roof prism mount 162 on the emergent side thereof.

*Scale illumination and imaging system*

The scales 22 and 23 and the vernier 25 (Figs. 1 and 4) are illuminated by an electric projection bulb (not shown) mounted within a lamp house 168 secured to the side wall 56 of the housing 55, which is provided with a tubular portion 169 containing a condensing lens system (not shown) connected to a mirror housing 170 in turn secured to the side wall 56 of the housing 55. By this means, light from the projection bulb in the lamp house 168 (Fig. 4) is transmitted through the condensing lens system in the tubular portion 169, and is reflected downwardly and approximately horizontally by mirrors within the mirror housing 170 through an aperture in the side wall 56 of the housing 55 so as to fall at an angle upon the scales 22 and 23 and vernier 25 (Fig. 5).

Figure 10:
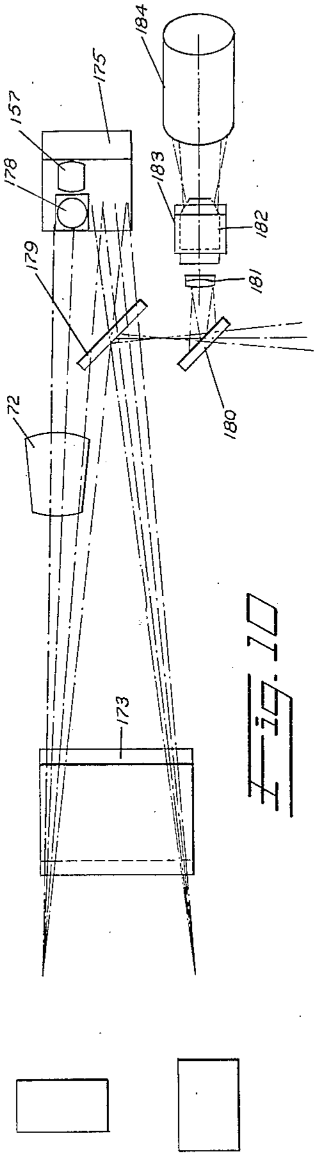
Fig. 10 is a schematic plan view of the scale imaging system.
Figure 11:
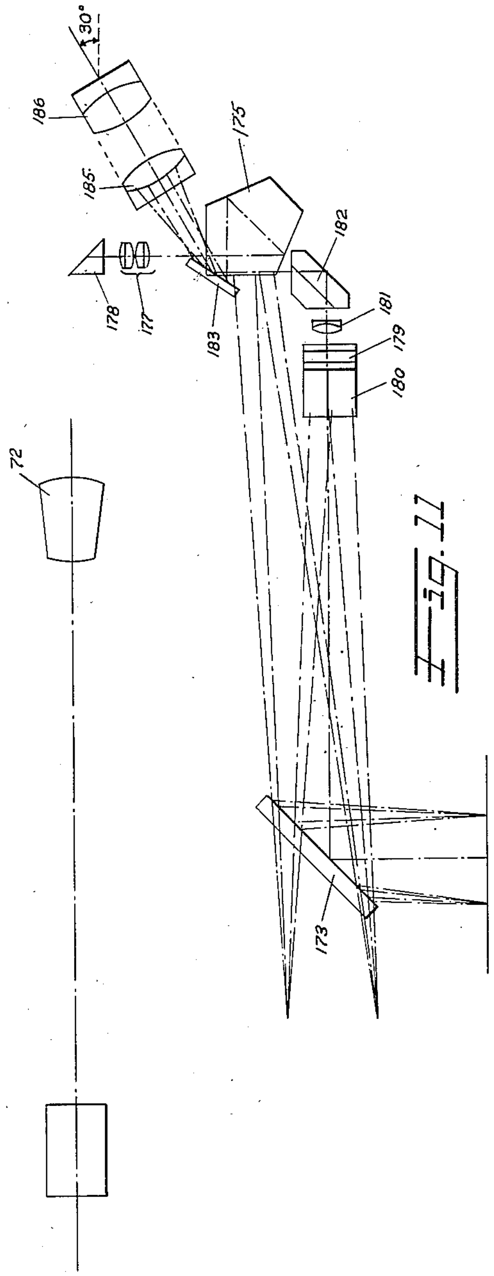
Fig. 11 is a slide elevation of the system shown in Fig. 10.

The optical system for imaging the scales 22 and 23 of the vernier 25 (Figs. 5, 7, 8, 10 and 11) consists of an inclined mirror 173 (Fig. 5) secured in a mount 174 attached to the rear wall 65 of the supporting structure 62. Said mirror 173 reflects the rays from the scales 22 and 23 and vernier 25 directly into a penta prism 175 (Figs. 5 and 10) supported in a mount 176 secured to the front wall 64 of the supporting structure 62. The rays are reflected within the penta prism along a triangular path and pass upwardly through a positive lens system 177 into a right angle prism 178 and come to a focus in the image plane 71 immediately below the images of the watch 137 and lower counter 117 (Fig. 5).

Figure 8:
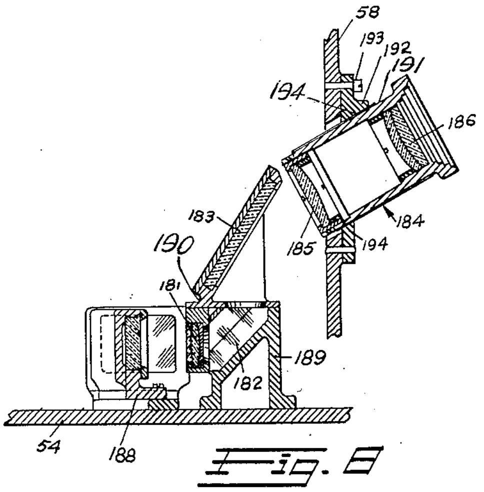
Fig. 8 is a vertical section taken along the line 8—8 of Fig. 4, showing a part of the visual scale viewing system.

A portion of the rays reflected by the mirror 173 is intercepted by a horizontally inclined mirror 179 (Fig. 5 and 10), thence by a horizontally inclined mirror 180 through an objective lens 181 into a roof prism 182 (Figs. 8 and 11), thence upwardly at right angles to an inclined mirror 183, and thence through an eye piece 184 consisting of the component lenses 185 and 186. In this manner the observer, by looking into the eye piece 184, may view the scales 22 and 23 and vernier 25, which are being photographed by the camera 70. The mirrors 179 and 180 are supported in mounts 187 and 188 secured to the bottom wall 54 of the housing 55 (Fig. 8). The objective lens 181 and the roof prism 182 are supported in a mount 189 likewise secured to the bottom wall 54 and the inclined mirror 183 is supported in a mount 190 secured to the top of the mount 189. The lenses 185 and 186 of the eye piece 184 are mounted in a tubular cell 191, which is in turn supported adjustably in a tubular mount 192 secured as at 193 to the front wall 58 of the housing 55 (Fig. 8). The cell 191 may be moved forward and backward in the bore 194 of the mount 192 for focusing purposes.

*Horizon optical system*

Figure 12:
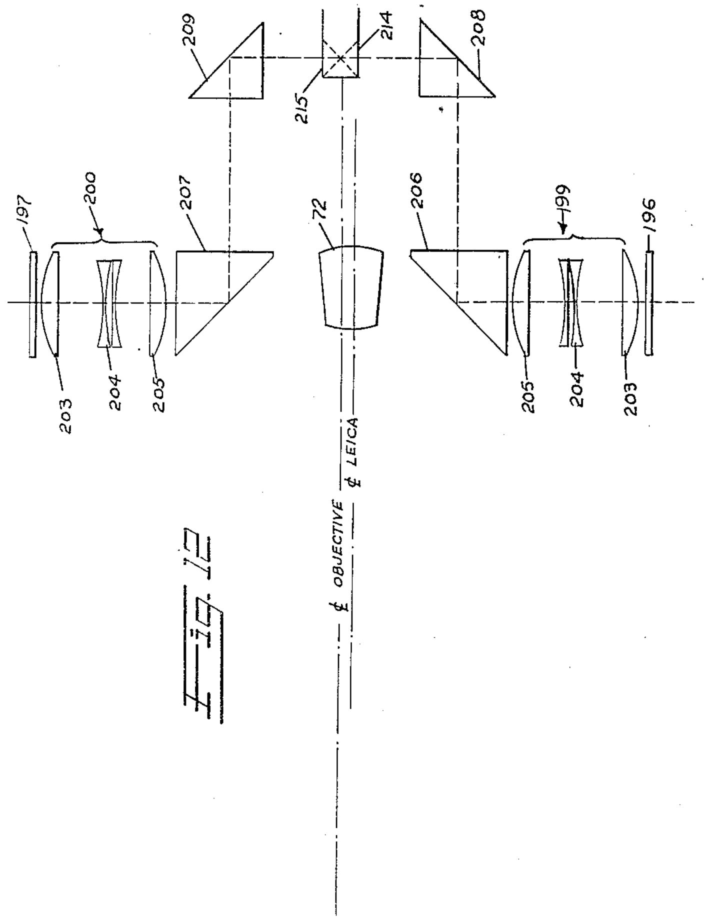
Fig. 12 is a schematic plan view of the horizon imaging system.
Figure 13:
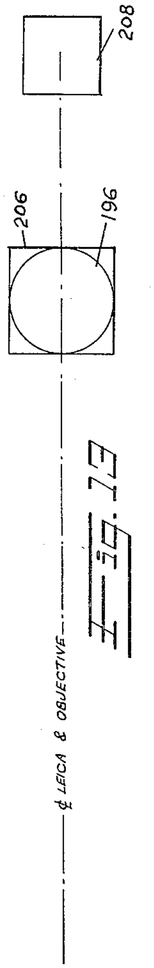
Fig. 13 is a side elevation of the system shown in Fig. 12.

In order to project an image of the horizon into the focal plane 71, an optical system is provided (Figs. 4, 5, 12 and 13) for receiving rays from diametrically opposite portions of the horizon. For this purpose the housing 55 is provided on the side wall 56 with a tubular projecting portion 195 containing a window 196 and on the opposite side wall 57 is provided with a similar window 197. Rays passing through the windows 196 and 197 traverse the similar objective lens systems 199 and 200 (Fig. 12) supported in the mounts 201 and 202 resting upon and secured to extensions of the top wall 63 of the supporting structure 62. The objectives 199 and 200 consist of three spaced component lenses 203, 204 and 205. After refraction by the objective lens systems 199 and 200, the rays are reflected twice at right angles to themselves by similar pairs of right angle prisms 206 and 207 (Figs. 4 and 12) and prisms 208 and 209. The prisms 206 and 207 are supported in mounts 210 and 211 and the prisms 208 and 209 in mounts 212 and 213 (Fig. 4) resting upon the top wall 63 of the supporting structure 62 on extensions thereof. Thus the principal rays emerging from the prisms 208 and 209 are parallel to the rays entering the objective lens systems 199 and 200.

Since only one of the objective lens systems 199 or 200 is in use at a given time, depending upon which part of the horizon is most visible, right angle selector prisms 214 and 215 are provided for selecting the objective to be used. The prisms 214 and 215 are mounted in a vertically reciprocable carrier 216, the arms of which are guided for vertical reciprocation (Fig. 5) in a vertically grooved guide bracket 217 mounted on the upper wall 63 of the structure 62. The arms of the carrier 216 are urged downwardly by coil springs 218 housed in the bracket 217 into engagement with a reciprocable rod 219 the lower end of which engages a conical cam 220.

Figure 9:
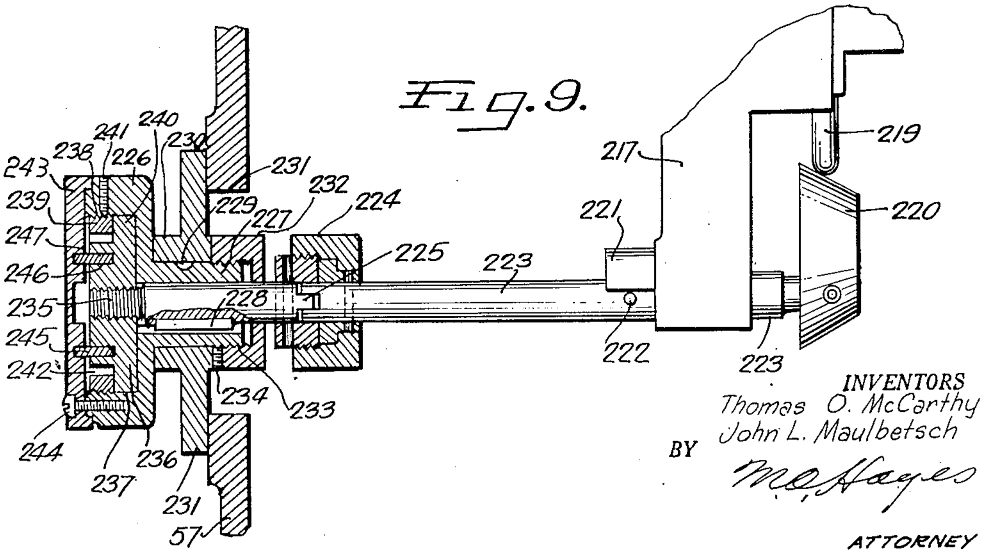
Fig. 9 is a vertical section taken along the line 9—9 of Fig. 5, showing the selector prism operating mechanism for selecting the horizon objective to be employed in photographing the then existing level and cross-level conditions.

The rotation of the cam 220 is limited by a stop 221 (Fig. 9), the opposite edges of which are engaged by a stop pin 222 mounted transversely in the shaft 223 on which the cam 220 is mounted, thereby positioning the prisms 214 and 215 accurately at the opposite ends of the stroke of their carrier 216.

The shaft 223 is connected separably for assembly and disassembly purposes by a screw coupling 224 to a shaft 225. Both of the shafts 223 and 225 are movable axially and precisely as a unit in order to shift the conical cam 220 and thereby vary the points to which the rod 221 and prisms 214 and 215 will rise and fall as the cam 220 is rotated. For this purpose, there is provided a hollow knob 226 having its hub 227 keyed as at 228 to the shaft 225 for limited axial movement, and journalled in the bore 229 of the sleeve portion 230 of a disc 231, which in turn is secured to the side wall 57 of the housing 55 adjacent the aperture therein. The knob 226 is retained in position and end play prevented by a lock collar 232 threaded upon the threaded end 233 of the hub 227 and locked in position by the set screw 234.

The end of the shaft 225 is threaded as at 235 and upon this is mounted a threaded disc 236, the periphery of which fits closely but rotatably into a cylindrical recess 237 within the hollow knob 226. The outer end of the recess 237 is threaded as at 238 to receive an annular threaded retaining ring 239. The latter fits sufficiently snugly against the flanged portion 240 of the disc 236 to prevent end play thereof and is locked in that position by the set screw 241.

Notches 242 for engagement by an adjusting spanner are provided for rotating the disc 236 precisely relative the knob 226, thereby moving the shafts 225 and 223 and the cam 220 endwise as a unit. A cover plate 243 fits over the recess 237 and is held in position by the screws 244 (only one being shown). A cylindrical washer 245 housed in the facing annular grooves 246 and 247 in the disc 236 and cover plate 243 holds the disc 236 against rotation relative to the knob 226 when the cover plate 243 is tightened down by the screws 244. This holds fixed the axial adjustment of the shafts 225 and 223 and cam 220 when the knob 226 is turned to rotate the cam 220 and raise or lower the rod 219, thereby raising or lowering the prisms 214 and 215. The portion of the conical cam 220 engaged by the end of the rod 219 is determined by this axial adjustment just described, and this in turn controls the upper and lower limits of position of the prisms 214 and 215, whereby the image of the horizon is adjusted to the zero of the reticle lines 253, as set forth below.

By turning the shafts 225 and 223 by means of the knob 226, the prism carrier 216 is moved up or down so that the selector prism 214 or 215 is presented in the path of the rays coming from one only of the prisms 208 or 209. Thus the right or left horizon objective 199 or 200 can be selected as desired, depending upon which horizon is unobstructed at the time. (As the instrument is generally mounted upon the signal bridge of a ship, portions of the ship's structure may at times prevent a view of the horizon from one side or the other.)

Figure 16:
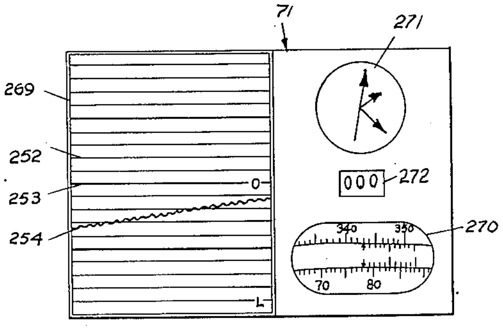
Fig. 16 is a front view, enlarged, of the image seen in the image plane of the instrument.

Engraved or etched upon the faces of the selector prisms 214 and 215 nearest the image plane 71 are horizontal reticle lines arranged two-tenths of a degree apart. These lines are too fine and too close together to be shown in Fig. 5, and hence are best described as shown by their image in the focal plane 71 (Fig. 16). The prisms 214 and 215 also have etched thereon the letters R and L, which distinguish which prism, which objective system 199 or 200, and which portion of the horizon is being used at the time, whether right or left.

The image on the left hand side of Fig. 16 shows the horizontal reticle lines 252 etched on the prisms 214 and 215. The central horizontal line 253 is also etched with a zero to indicate the position of the cross-level coincident with the horizon. The image seen in Fig. 16 is inverted, with the sea at the top, the sky at the bottom and the horizon in-between. The horizon is shown by the undulating line 254, which would be the image of the waves in a choppy sea. In a dead calm, the line 254 would be a smooth straight line. The position of the line 254 above or below the zero 253 indicates the deviation from cross-level, whereas the inclination of the line 254 relative the nearest line 252 indicates the level existing at the instant the exposure was made. The inclination of the line 254 is exaggerated in Fig. 16. In practice, the cross-leveller would maintain the instrument, and therefore the horizon image 254, more nearly level than shown in Fig. 16.

*Sun telescope and mounting*

The cover plate 60 of the casing 55 is provided with an upstanding cylindrical portion 255 (Fig. 5) upon which the sun telescope 13 is mounted. For this purpose there is provided a mating cylindrical member 256 fitting over the portion 255, and this is provided with an annular ridge 257 and seat 258 for receiving the downwardly projecting flange 259 of the telescope mount 260. These parts are held together by a secrew 261 threaded into a threaded bore 262 in the center of the upstanding portion 255. The telescope mount 260 is provided with an extension 263, which normally carries a vernier cooperating with an upstanding projection 264 on the cover plate 60. A fine adjustment consisting of a worm and quadrant (not shown) mounted on the telescope mount 260 enables the latter to be moved by fine increments relative the member 256. (The mount 260 and parts thereabove are conventional and of standard construction in sun telescopes as used by the U. S. Navy, and their details form no part of the present invention.) Rising from the telescope mount 260 are spaced arms 265 carrying trunnions 266 upon which the sun telescope 13 is supported (Fig. 1). A pointer 267 secured to the telescope 13 at its axis of support cooperates with an arcuate degree scale 268 in such a manner as to indicate the amount of tilt of the telescope 13. The latter is provided with a reticle (not shown) preferably having central cross lines and vertical stadia lines spaced at equal distances from the central vertical cross line and on opposite sides thereof. The spaced vertical stadia lines are separated by the angular distance subtended by the sun's disc.

Meanwhile an observer can measure the altitude of the sun above the horizon with a sextant and swing the sun telescope 13 about its trunnions 266 until the pointer 267 indicates the same altitude upon the scale 268. Another observer looking through the telescope 13 will then find that the stadia lines thereof are substantially aligned upon the opposite edges of the sun's disc, provided of course that the sun telescope 13 is rotated to the correct azimuth. The sun telescope 13 is provided with the usual ray filters or crossed polarizing plates (not shown) to cut down the intensity of the sun's image and avoid injury to the eyes of the observer.

*Operation*

When the instrument is installed it is assumed that the proper adjustments have been made so that the scales 22 and 23 and vernier 25 read properly according to the center line of the ship. The watch 137 is also carefully checked by the ship's chronometer and installed in its proper position. The camera 70 is loaded with film and is inserted in the instrument and secured rigidly, as by screws passing through the shelf 68 and the usual tripod socket (not shown). It is assumed that the cross-level telescope 36 has also been lined up properly so that its cross lines coincide with the horizon when the instrument 10 is perfectly level. The electrical cables for supplying current to the illumination bulbs are then energized. Light filters, diaphragms or stops are applied, if necessary, to the light coming through the horizon windows 196 or 197 so that the proper light intensity is obtained. The shutter speed of the camera 70 is regulated for the intensity of illumination supplied by the illumination systems for the scales 22 and 23, watch 137 and counter 117.

The cross leveller maintains the horizontal cross lines of his telescope 36 on or as close as possible to the horizon by steadying the camera with his hands on the uprights 33. The exact condition of cross-level is as previously stated indicated by the appearance of the horizon line 254 (Fig. 16) relative the reticle lines 252 and 253, hence precise cross leveling is not essential. The sun telescope observer moves the telescope 13 and with it the instrument 10 so as to center the sun between the stadia lines in the sun telescope reticle. Very small movements of the azimuth knob 50 (Fig. 1) suffice to make this adjustment. The direction indicator 11 stabilizes the instrument 10 directionally in space and with it the sun telescope 13 and its stadia lines, within the limits of accuracy of the direction indicator 11 and its transmission systems. The sun observer operates the shutter release button 90 or the flexible cable release 91 therefor when the sun is centered between the stadia lines in the reticle and the sun telescope 13. This operation makes an exposure focused upon the image plane 71 (Fig. 16), which records simultaneously the image 269 of the horizon and prism reticle lines, the image 270 of the readings of the scales 22 and 23 and vernier 25, and likewise the images 271 and 272, the readings of the watch 137 and counter 117 (Fig. 16). When the shutter has been operated by depressing the button 90, the film is then transported and the shutter reset by turning the rewind knob 105. This action also moves the counters 117 and 118 ahead one unit. The next observation is photographed in a similar manner and the observations and exposures repeated at suitable intervals over a period of several hours, depending upon the capacity of the camera 70. The camera 70 ordinarily has a capacity of several hundred exposures.

Meanwhile the direction indicator 11 will automatically maintain the spaced vertical stadia lines of the reticle in the sun telescope 13 very closely in alignment with the opposite edges of the sun's disc. Errors in the direction indicator 11 or the gyrocompass system will cause these stadia lines to deviate from such alignment with the sun's disc, and this deviation is a measure of the error to be determined. When, due to this error, the stadia lines drift away from such alignment with the sun's disc, the operator brings them back into alignment by turning the azimuth knob 50. Ordinarily, observations are taken with the ship steering various courses and turns. During such turns the gyrocompass oscillates and produces errors, particularly when a sharp turn is executed. The observations, photographed by the present apparatus, enable these errors to be determined accurately.

When the observations are completed the film is removed from the camera and processed. From an analysis of each exposure of the film, the appearance of one exposure of which is seen in Fig. 16, a plot or graphic chart is prepared. For each exposure, said plot or chart will indicate the error of the master gyrocompass and direction indicator 11, such as a self-synchronous alidade. The compass bearing of the sun, corrected for the cross-level and time of observation, is referred to the true bearing of the sun as computed by well known navigational methods, such as are shown in publications of the Naval Hydrographic Office. The difference between the true observed bearing and the computed bearing is the error of the direction indicator 11, which it is desired to ascertain. These errors are plotted against the time of each observation and for the particular course being steered, so that a running record of the variation of the errors is obtained. From these graphs, the performance of the particular direction indicator 11 can be determined accurately under a wide variety of conditions at sea or in the air and a permanent record obtained.

The construction and operation of the instrument has been described particularly in connection with its installation aboard a ship. It will be understood, however, that the same instrument may be employed to determine the errors of direction indicators mounted upon aircraft or upon land vehicles, following an analogous procedure.

It will be further understood that a terrestrial landmark, if available, can be, and frequently is, used instead of a celestial body. The operational procedure is the same in taking observations but a different method of computation must be used to determine the true direction of the landmark from the observer at the instant the observation is made.

*Definitions*

In the specification and claims hereof it will be understood that the use of the term "sun" comprehends other celestial bodies such as stars or planets, the sun being the most conveniently used body and the one most frequently selected.

The term "compass" as used herein is defined as a device having means for maintaining itself in a substantially constant angular relationship with the projection of the earth's axis on the horizontal plane at the location of the device.

The term "level" as used herein is defined as the angular tilt of an assumed datum plane of the instrument, such as the compass card, about a horizontal axis perpendicular to the line of sight of the sun telescope.

The term "cross-level" as used herein is defined as the angular tilt of an assumed datum plane of the instrument, such as the compass card, about a horizontal axis in the line of sight of the sun telescope.

It is to be understood that various modifications and changes may be made in this invention without departing from the spirit and scope thereof as set forth in the appended claims.

The invention described herein may be manufactured and used by or for the Government of the United States of America for Governmental puropses without the payment of any royalties thereon or therefor.

We claim:

1. A performance recording instrument for a direction indicator or direction stabilizer having a rotary element and an index-equipped bearing scale therefor, comprising a support attachable to said rotary element and rotatable therewith, means for illuminating said bearing scale, a scale optical system on said support adapted to project an image of a portion of said bearing scale into a predetermined image plane, a horizon optical system on said support adapted to project an image of a portion of the horizon into said predetermined image plane, a tilt indicator disposed in comparison relationship with said horizon image whereby to indicate the level and cross-level of said instrument, and means for simultaneously reproducing said images and the tilt indication of said tilt indicator.

2. A performance recording instrument for a direction indicator or direction stabilizer having a rotary element and an index-equipped bearing scale therefor, comprising a support attachable to said rotary element and rotatable therewith, means for illuminating said bearing scale, a scale optical system on said support adapted to project an image of a portion of said bearing scale into a predetermined image plane, a horizon optical system on said support adapted to project an image of a portion of the horizon into said predetermined image plane, a tilt indicator disposed in comparison relationship with said horizon image whereby to indicate the level and cross-level of said instrument, a timer, means for rendering said timer visible in said image plane, and means for simultaneously reproducing said scale image, said horizon image, the tilt indication of said tilt indicator and the time indication of said timer.

3. A performance recording instrument for a direction indicator or direction stabilizer having a rotary element and an index-equipped bearing scale therefor, comprising a support attachable to said rotary element and rotatable therewith, means for illuminating said bearing scale, a scale optical system on said support adapted to project an image of a portion of said bearing scale into a predetermined image plane, a horizon optical system on said support adapted to project an image of a portion of the horizon into said predetermined image plane, a tilt indicator disposed in comparison relationship with said horizon image whereby to indicate the level and cross-level of said instrument, a timer, means for rendering said timer visible in said image plane, an observation counter visible in said image plane, and means for simultaneously reproducing said scale image, said horizon image, the tilt indication of said tilt indicator, and the time and number indications of said timer and counter respectively.

4. A performance recording instrument for a direction indicator or direction stabilizer having a rotary element and an index-equipped bearing scale therefor, comprising a support attachable to said rotary element and rotatable therewith, means for illuminating said bearing scale, a scale optical system on said support adapted to project an image of a portion of said bearing scale into a predetermined image plane, a horizon optical system on said support adapted to project an image of a portion of the horizon into said predetermined image plane, a tilt indicator disposed in comparison relationship with said horizon image whereby to indicate the level and cross-level of said instrument, a timer, means for rendering said timer visible in said image plane, an observation counter visible in said image plane, means on said support for simultaneously photographing said scale image, said horizon image, the tilt indication of said tilt indicator, and the time and number indications of said timer and counter respectively, and means responsive to the photographing of each observation for actuating said counter.

5. A performance recording instrument for a direction indicator or direction stabilizer comprising a housing mounted on the output shaft of said indicator, a sun telescope mounted on said housing, means to rotate said housing and sun telescope relative said shaft and into alignment with the sun's image, a bracket carrying a cross-level telescope at right angles to said sun telescope mounted on the gimbal ring of said indicator, an azimuth scale connected to said shaft, a stationary scale fixed relative to a reference line, means for reproducing an image, said means being mounted in said housing, a first optical system adapted to image said azimuth and stationary scales at the focal point of said means for reproducing an image, a timer, a counter actuated by said reproducing means, a second optical system adapted to image said timer and said counter at said focal point, and a third optical system adapted to image the horizon and a reticle in the common image plane indicating the condition of level and cross-level at said focal point.

6. A performance recording instrument for a direction indicator or direction stabilizer comprising a housing mounted on the output shaft of said indicator, a sun telescope mounted on said housing, means to rotate said housing and sun telescope relative said shaft and into alignment with the sun's image, a bracket carrying a cross-level telescope at right angles to said sun telescope mounted on the gimbal ring of said indicator, an azimuth scale connected to said shaft, a stationary scale fixed relative a reference line, said azimuth and stationary scales each having an illuminated index and vernier, means for reproducing an image, said means being mounted in said housing, a first optical system adapted to image said azimuth and stationary scales at the focal point of said means for reproducing an image, a second optical system adapted to image said azimuth and stationary scales at a visual observation point, a timer, a plurality of counters actuated by said reproducing means, one of said counters being visible at an observation point, a third optical system adapted to image said timer and one of said counters at said focal point and a fourth optical system adapted to image the horizon and a reticle in the common image plane indicating the condition of level and cross-level at said focal point.

7. A performance recording instrument for a direction indicator or direction stabilizer having a rotary element, comprising a support attachable to said rotary element and rotatable therewith, a horizon optical system on said support adapted to project an image of a portion of the horizon into an image plane interior said support, a tilt indicator disposed in comparison relationship with said horizon image and adapted to indicate the level and cross-level of said instrument in said image plane, and means for reproducing the image presented in said image plane.

8. A performance recording instrument for a direction indicator or direction stabilizer having a rotary element, comprising a support attachable to said rotary element and rotatable therewith, a horizon optical system on said support adapted selectively to project images of diametrically opposite portions of the horizon into an image plane interior said support, means for selecting one of said horizon images and projecting it into said image plane, a tilt indicator disposed in comparison relationship with said horizon image whereby the level and cross-level of said instrument is indicated, and means on said support for photographing the selected horizon image and said tilt indicator.

9. A performance recording instrument for a direction indicator or direction stabilizer having a rotary element and an index-equipped bearing scale therefor, comprising a support attachable to said rotary element and rotatable therewith, means for illuminating said bearing scale, a scale optical system on said support adapted to project an image of a portion of said bearing scale into an image plane interior said support and normal to the plane of said bearing scale, a horizon optical system on said support adapted to project an image of a portion of the horizon into said image plane, a tilt indicator disposed in comparison relationship with said horizon image whereby the level and cross-level of said instrument is indicated, and means for reproducing said images and the tilt indication of said tilt indicator simultaneously.

THOMAS O. McCARTHY.
JOHN L. MAULBETSCH.

REFERENCES CITED

The following references are of record in the file of this patent:

UNITED STATES PATENTS

| Number | Name | Date |
|---|---|---|
| 1,432,570 | Roux | Oct. 17, 1922 |
| 1,839,893 | Pierce | Jan. 5, 1932 |
| 1,908,947 | Benjamin | May 16, 1933 |
| 2,091,768 | Noble | Aug. 31, 1937 |
| 2,181,832 | Moerbitz et al. | Nov. 28, 1939 |
| 2,239,539 | Schmidt et al. | Apr. 22, 1941 |
| 2,266,741 | Crane et al. | Dec. 23, 1941 |
| 2,336,081 | Finnegan et al. | Dec. 7, 1943 |